June 23, 1959 S. SABAROFF 2,892,079

SQUELCH SYSTEM FOR COMMUNICATIONS RECEIVERS AND THE LIKE

Filed June 23, 1958

INVENTOR.

Samuel Sabaroff 2,892,079

SQUELCH SYSTEM FOR COMMUNICATIONS RECEIVERS AND THE LIKE

Samuel Sabaroff, Havertown, Pa.

Application June 23, 1958, Serial No. 743,818

7 Claims. (Cl. 250—20)

Figures 1, 2, 3:
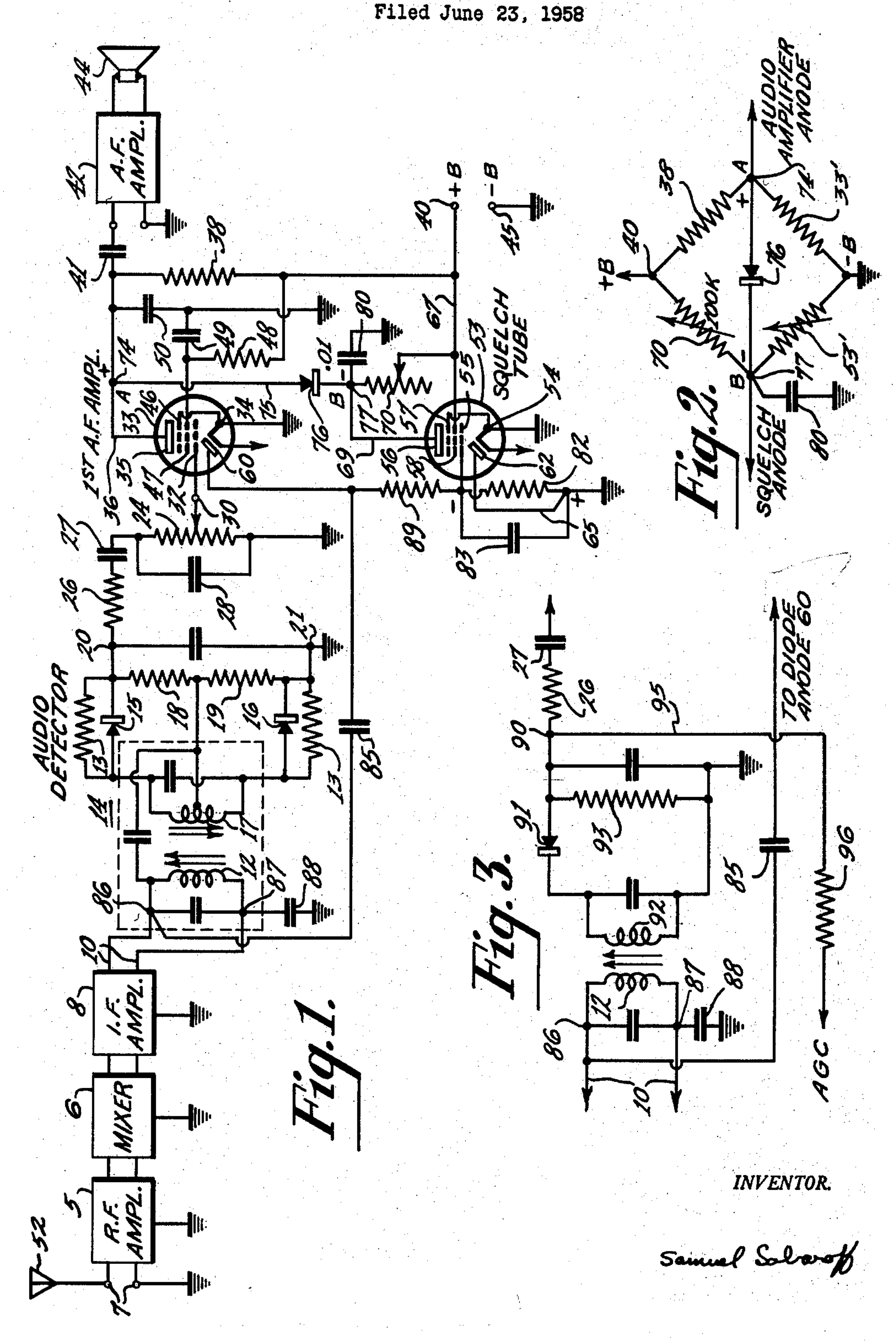

The present invention relates to radio signal receivers of the communications or voice transmission type. More particularly, the present invention relates to squelch systems for communications type receivers.

As is well known, squelch systems for radio receivers operate to cut off signal flow through the receiver at some point thereby to suppress or cut-off the sound output in the absence of a received signal or above the local noise level. In this way noise output from the receiver, when tuning between stations, is prevented. There is a wide choice for the control point in the receiver for effecting signal suppression or cut-off and likewise many different systems have been proposed in the past for applying the cut-off control. Many of these are both complicated and costly for application to a receiver, and provide limited or slow on-off control action.

It is, accordingly, a primary object of the present invention to provide an improved and simplified squelch system for communications receivers and the like which provides rapid on-off action and which obviates the complication, cost and other disadvantages of squelch or suppression systems heretofore used.

It is a further object of this invention, to provide an improved and simplified squelch or signal suppression circuit which is readily applicable to existing signal conveying circuits in a communications type receiver and which does not interfere with the normal operation of the receiver.

It is a still further object of the present invention, to provide an improved squelch or signal suppression system for communications type receivers and the like which may be applied to the audio frequency amplifier portions thereof and which may readily be adjusted for any desired degree of sensitivity and without loading the signal or control source in the receiver for its operation.

In accordance with the invention, a squelch or signal suppression system for communications type receivers includes a bridge circuit with the anode or output circuit of an audio frequency amplifier stage and the anode or output circuit of a squelch or suppression stage connected at opposite points on the bridge circuit and with the remaining opposite operating current or potential supply terminals of the bridge circuit connected to the positive and negative terminals of the anode supply circuit. The negative terminal is generally connected to chassis ground for the system. A diode rectifier device is connected, as the bridge element between the opposed points, between the output circuits. The diode is poled for normal forward conduction from the output circuit of the amplifier stage to the output or high side of the squelch or suppression stage. An audio frequency signal bypass capacitor is connected between the high side of the squelch stage and chassis or ground. The audio frequency amplifier point selected is generally the first audio frequency amplifier stage of the receiver. For tube type receivers presently used this stage is supplied with anode current through an anode coupling resistor which is at the same time a current limiting resistor. The first audio amplifier tube is therefore preferably a pentode device and likewise the squelch tube is preferably of the same type. Signal responsive biasing potential supply means includes a signal rectifier coupled to the signal channel of the receiver between the intermediate frequency amplifier and the audio or second detector. Thus it is given a broad-band response characteristic with respect to that of the detector. The squelch tube is supplied with anode current through a squelch-level control resistor. This is variable or adjustable to provide a desired unbalance of the bridge circuit for current flow in the forward direction of conduction for the diode, thereby to cut-off signals through the first stage audio frequency amplifier. The balance of the bridge is changed by the presence of a received signal which increases the negative bias on the squelch tube and changes the blance of the bridge in a direction to cause conduction through the diode to be cut off by a reverse bias potential in the bridge circuit. By this arrangement a rapid switching action is obtained which controls the receiver output but without the use of relays or complicated circuitry.

The novel features that are considered to be characteristic of this invention are set forth with particularity in the appended claims. The invention itself, however, both as to its organization, as well as additional objects and advantages thereof will best be understood from the following description when read in connection with the accompanying drawings, in which:

Figure 1 is a schematic circuit diagram of a frequency-modulation radio signal receiver of the communications type having a squelch or signal suppression system embodying the invention, Figure 2 is a schematic circuit diagram of a portion of the circuit of Figure 1 showing a bridge circuit arrangement of the elements thereof to illustrate a principle of the operation of the invention, and Figure 3 is a further schematic circuit diagram of a modification of the circuit of Figure 1, showing the manner for deriving control potentials with a modified form of detector circuit for amplitude modulation signal reception.

Referring to the drawing in which like elements throughout the various figures are designated by like reference characters, and referring particularly to Figure 1, the frequency-modulation radio signal receiver, shown by way of example, includes tunable radio-frequency amplifier and mixer circuits or stages, indicated by block elements 5 and 6, connected between antenna or signal input terminals 7. The intermediate-frequency amplifier circuits or stages, indicated by the block element 8, receive a signal derived from the intermediate-frequency amplifier through output leads 10 which are connected with the input or primary winding 12 of a discriminator network 14. This is of the balanced type, involving two signal-rectifier diodes 15 and 16 connected between the secondary 17 of the network and balanced output resistors 18 and 19. The detector diodes are provided with shunt stabilizing resistors 13.

Output terminals 20 and 21 for the network are connected to a volume control potentiometer 24 through chassis or ground for the receiver and a series coupling connection comprising a limiting resistor 26 and a capacitor 27. The potentiometer is bypassed for intermediate frequency signals by a suitable capacitor 28. The variable contact 30 of the volume control potentiometer 24 is connected with the signal input grid 32 of a first audio frequency amplifier tube 33 having a cathode 34 connected to ground as indicated. The anode 35 is connected through an anode circuit 36 which includes an anode resistor 38 of relatively high resistance connected to the positive anode voltage supply source indicated by a terminal 40. The anode circuit is provided with an output coupling capacitor 41 connected between the high potential or anode end of the anode resistor 38 and audio frequency amplifier circuits indicated by the block 42. The latter is in turn connected with a suitable loudspeaker or sound output device 44. The negative anode potential supply source, indicated by the terminal 45, is connected to chassis or ground for the system.

It will be noted that the first audio frequency amplifier tube 33 is of the pentode type having a cathode or suppressor grid 46 and a screen grid 47, the latter being supplied with operating potential through a relatively high resistance series supply resistor 48 from the positive supply terminal 40, and being provided with a filter capacitor 49 connected to ground or chassis. The anode circuit 36 is likewise bypassed to ground through a capacitor 50 removing high frequency signal and noise potentials without suppressing the voice or modulation component of a received signal to any appreciable degree.

As may be observed from an inspection of the receiver circuit thus far described, it will be seen that signals received from an antenna 52 or other suitable signal source, at the terminals 7, are selected and amplified in the input circuits 5, 6 and 8, and demodulated at the detector or discriminator 14 and applied to the volume control device 24. The desired signal level for normal sound output is adjusted by setting the volume control tap 30 so that the first audio amplifier stage delivers the proper level anode audio frequency signal to the remaining portion of the amplifier 42 and the loudspeaker 44.

The receiving system or receiver thus far described will translate all received signals without suppression and subject only to manual adjustment of the audio frequency volume level by the control device 24—30. As is well known, it is possible to turn this control down substantially to zero output to a setting for suppressed output, and then tune between stations without noise, but it involves manual adjustment and readjustment of the volume control device for each setting of the tuning system, that is, for the reception of each newly selected signal or station to be received.

For automatic squelch or signal suppression control of the receiving system described, in accordance with the invention, a squelch or suppression tube 55 is provided for control of the audio frequency portion of the receiver in response to a received signal at the input side of the audio or second detector. In order to simplify the receiver and the operation, both the first audio frequency amplifier tube 33 and the squelch tube 53 are of the same construction, both preferably, being, as shown, of the pentode type. The tubes are thus interchangeable and the addition of the squelch tube does not add a different type of tube to those already in the receiver. Furthermore, the pentode type tube gives better gain in the audio stage and sharper cut-off in the squelch stage than a triode. Also, duplication of tube type provides for better balance of the bridge circuit hereinafter referred to. The tube 53 thus is provided with a cathode 54, a control grid 55, an anode 56, and suppressor and screen grids 57 and 58, respectively. In addition, each tube includes a diode anode in association with the cathode, as indicated at 60 in the tube 33 and at 62 in the tube 53. These tubes may be of the type, for example, known commercially as 1AJ5 pentodes.

In the squelch tube 53 the diode anode 62 is not used actively, being connected to ground, as indicated, through a connection lead 65. As in the case of the tube 53, the suppressor grid 57, in the tube 53, is connected to the cathode 54. The screen grid 58 is connected through a lead 67 with the positive anode supply terminal 40, and the cathode is connected to ground, whereby, like the cathode 34, it is connected to the negative anode supply terminal 45. The anode circuit 69, for the anode 56 of the squelch tube, includes a series anode resistor 70 which is of the variable type, having an adjustable contact 71 connected to the supply lead 67 and the positive terminal 40, for anode voltage supply to the anode 56.

A terminal 74, selected as the squelch point on the anode circuit 36 of the first audio frequency amplifier tube 33, is connected through a lead 75 and a diode rectifier device 76 which may be designated as a diode, to a corresponding point or terminal 77 on the anode circuit 69 of the squelch or suppression tube 53. The terminals 74 and 77 are likewise designated by the letters A and B respectively and will hereinafter be referred to as the A and B points of the anode circuits, respectively, of the first audio frequency amplifier stage and of the squelch or suppressor stage which comprises the tube 53 and its associate circuits. It will be noted that the diode 76 is connected directly between the points A and B, that is, between the terminals 74 and 77, which points or terminals are located between the high potential or anode ends of the resistors 38 and 70 respectively, and effectively, directly between the anode of the two tubes. It will further be noted that the diode 76 is poled in a direction to provide forward conduction from the point A to the point B. When conduction takes place in this direction, the internal impedance of the diode is substantially zero, thereby effectively connecting point A with point B.

A signal bypass capacitor 80 is provided between the terminal 77 or point B and ground. This capacitor is of a relatively low impedance to the audio frequency signals transmitted through the anode circuit 36. Such signals may thus be suppressed or cut-off by reason of an effective short circuit to ground when the control diode 76 is conducting, which is the normal condition of operation of the circuit and of the diode 76. To effect such forward conduction and short circuit of the signals through the capacitor 80 and the diode 76, the point B of the suppression circuit is operated normally at a lower positive potential than the point A. This condition of operation is attained by adjustment of the squelch lever control resistor 70. As will be seen, this serves to vary the anode resistance of the control tube 54 and consequently the anode current and the potential drop through the resistor 70. In this way, the potential drop through the resistor 70 is caused to be greater than the potential drop through the resistor 38 in the anode circuit of the tube 34. The normal condition of operation then is for the point A to be positive and the terminal or point B to be negative relatively, as indicated. Therefore, in the absence of signals being received, the receiver is silent as the noise level is below the setting of the noise control circuit.

The normal bias on the squelch tube 54 is such that the anode current is relatively heavy and this arrangement is provided simply and effectively by connecting a grid resistor 82 having a relatively high value, such as 10 megohms in the present example, between the grid 55 and ground for the circuit. Grid current flow thus establishes a predetermined small amount of negative bias on the grid 55 with respect to the cathode 54 for normal operation. A small bypass capacitor for R.F. currents is provided in shunt with the resistor 82, as indicated at 83.

To permit the flow of audio frequency signals through the anode circuit 36 without cut-off by the diode 76 and the capacitor 80, it will be seen that the point B on the squelch circuit must be raised in potential in the positive direction until it exceeds the positive potential at point A, that is, until the diode 76 is reverse-biased. This may be done by increasing the negative bias on the control grid 55 of the squelch tube 53 above the normal bias established by the resistor 82 so that the anode current flow through the anode circuit 69 and the squelch level control resistor 70 is reduced sufficiently to reduce the voltage drop through the resistor 70 such that the point B becomes more positive than the point A. At this point the diode 76 cuts off and operates as a switch to open the circuit to the capacitor 80, thereby permitting the flow of signals through the anode circuit 36 to the remainder of the amplifier 42 and the loudspeaker 44.

Further in accordance with the invention, the negative control potential for the squelch tube 53 is derived by a simple circuit connection with one of the available diode electrodes 60 or 62 in the duplicate tubes 33 or 53. Preferably the diode 60 is utilized, and to this end is coupled through a coupling capacitor 85 with the high signal potential input terminal 86 of the input winding 12 of the discriminator network 14. The low potential terminal of the input winding 12, indicated at 87, is coupled to ground or chassis through a suitable capacitor 88 thus coupling this terminal with the ground end of the grid resistor 82 for the squelch tube. To supply the rectified signal voltage to the grid 55 from the diode anode 60, a coupling resistor 89—89 is connected between the diode 60 and the grid 55 as shown. This resistor may have a value of 1 megohm, for example, and the coupling capacitor 85 may have a value of 22 micro-microfarads. The negative squelch control potential for the grid 55 is derived without appreciable loading of the signal circuit connected with the input winding 12 of the audio detector, since a relatively small coupling capacitor 85 is utilized and the resistors 89 and 82 in series across this circuit represent a load of approximately 11 megohms which is relatively light.

With this arrangement it will be seen that in response to a selected signal being applied to the audio detector or discriminator network 14, a portion of the signal is rectified between the diode anode 60 and the cathode 34 of the first audio frequency amplifier tube 33 and this resulting D.C. bias potential is applied to the grid 55 through the coupling resistor 89, to increase the negative bias potential on this grid. The relation of the impedances of the resistors is such that any signal of normal amplitude will provide a relatively large increase in negative bias potential on the grid 55 and sufficient to effect a wide change in anode current through the resistor 70 of the squelch tube.

By adjusting the resistor 70, the difference in poential between the points A and B may be made such that only a slight change in anode current of the squelch tube will effect reverse bias of the diode 76. The receiver may thus be made sensitive to the reception of weak signals, or by adjusting the resistor 70 to provide a relatively wide difference in potential between the points A and B, only the strongest received signals will be effective to raise the potential of the point B in a positive direction to overcome the potential of the point A and effect signal transmission.

From the foregoing description, it will be seen that the diode 76 floats on the plate circuits of the first audio amplifier tube and the squelch or suppression tube, and that the squelch circuit is arranged in the form of a bridge shown more clearly in Figure 2 to which attention is directed along with Figure 1. In Figure 2 the impedance of the space paths of the two tubes are represented by the resistors 53′ and 33′ for the tubes 53 and 33 respectively. In this circuit the points A and B are indicated by legend as being connected to the squelch and audio amplifier anodes, with the diode 76 connected directly between these points, and with the signal bypass capacitor 80 connected to ground from the point B. Between the point B and the positive terminal 40 for the anode current supply, the variable resistor or squelch level control resistor 70 is connected, while between the point A and the terminal 40, the anode resistor 38 is connected to complete the bridge circuit.

With this arrangement it will be seen that the resistors 70 and 53′ are variable, the first one being manually variable to effect a static condition of unbalance in the bridge circuit for a static condition of the resistor 53′ such that the diode 76 is forward biased and conducting. This effectively short circuits the point A to ground through the diode and the cut off capacitor 80 in the absence of signals. Upon the application of signals to the receiving system, the resistance of the resistor 53′ increases by reason of the negative bias on the squelch tube so that the point B rises in potential in a positive direction to overcome the potenial at point A and to provide a reverse bias on the diode 76, whereupon the points A and B are decoupled and the effect of the cut-off capacitor 80 on the audio frequency amplifier circuit is prevented.

In operation, the control resistor 70 is adjusted to balance out the noise level at the receiver. The contact 71 is moved toward the point B, as viewed in the drawing, to bring the squelch circuit to the noise level, that is, to just open and let signals through. Then by moving it slightly in the opposite direction, cut off occurs, and noise is kept out. Then any signal above the noise level will come in, that is, operate to open the squelch circuit.

By utilizing a 1 megohm resistor in the anode circuit of the audio frequency amplifier tube, a pentode type tube may effectively amplify audio frequency signals with this high degree of plate resistance while at the same time the current flow through the diode when forward biased, is reduced thereby. This is made possible by the fact that the resistor 38 is common to both the diode and the anode connection with the positive supply terminal or source 40.

The squelch or signal suppression system of the present invention is equally applicable to AM and FM receivers. In this present example, it is shown in its application to an FM receiver type. It may equally apply to an AM receiver circuit in accordance with the same principles as will be seen by further reference to Figure 3 in which an AM detector is shown having an input winding 12 as in the previous example in connection with the intermediate frequency amplifier output circuit 10. An AM detector 91 is coupler through a secondary winding 92 with the input winding 12. The detector 91 is a diode having an output resistor 93 connected between ground and the detector output terminal 90. The series coupling resistor 26 and capacitor 27 are coupled to the terminal 90 for connection with the volume control potentiometer as in the previous example, and AGC potentials may also be derived from the terminal 90 through an AGC supply lead 95 in which is connected a series decoupling resistor 96 as shown.

The squelch or signal suppression circuit shown and described involves a simple bridge circuit readily applicable to existing receiver circuits without added complication other than an additional tube, preferably with a duplicate tube in the audio signal circuit, and without loading the second detector signal input circuit for the derivation of the control potential. Furthermore, the circuit involves a simple diode rectifier poled in a normal forward biased conducting position between two anode circuits, one of which is the audio frequency circuit and the other of which is for the control or squelch circuit. By means of the level control, the circuit may be made to respond with a high degree of sensitivity to signals above the ambient noise level at the receiver. The drain on the anode supply system is limited at all times by the combined anode resistor and diode limiting resistor in the audio frequency circuit. This system has wide application in communication receivers for the transmission of intelligence at voice frequencies.

What is claimed is:

1. A signal squelch system for communications receivers and the like, comprising in combination, a pair of electronic-tube amplifier stages each having an anode current supply resistor, a diode rectifier connected between the anode ends of said resistors, means for applying signals to one of said stages for translation therethrough, said rectifier being poled to conduct in the direction of the anode resistor of said other stage, means for varying the anode current supply resistor for the other stage to lower the anode voltage thereof to a value negative with respect to the anode voltage of the signal translating stage to provide conduction by said diode rectifier and signal cutoff through said signal translating stage, and signal-responsive bias-control means for the other stage connected to reduce the anode current flow through and the potential drop in the anode current supply resistor thereof, thereby to increase the bias on said diode rectifier in a reverse direction to cut off conduction therethrough and permit signal flow through said signal translating stage.

2. A signal squelch system for communications receivers and the like, comprising in combination, a pentode electronic-tube amplifier stage and a pentode electronic-tube control stage each having an anode-current supply resistor, a diode rectifier connected between the anode ends of said resistors, means for applying signals to the amplifier stage for translation therethrough, said rectifier being poled to conduct current in the direction of the anode resistor of said control stage, means for varying the anode current supply resistor for the control stage to lower the anode voltage thereof in a negative direction with respect to the anode voltage of the amplifier stage to provide conduction by said diode rectifier and signal cutoff through said amplifier stage, and signal-responsive bias-control means connected with said control stage to vary the anode current through said supply resistor and bias said diode rectifier in a reverse direction, thereby to cut off conduction therethrough and to permit signal translation through said amplifier stage.

3. In a modulated signal receiver, a signal squelch system comprising in combination, an electronic-tube audio-frequency amplifier stage connected for signal translation and having an output circuit including a current-limiting anode resistor, an electronic-tube squelch control stage having an anode current supply circuit including a variable anode resistor, said resistors and the space paths of said amplifier and squelch control stages being connected to provide a bridge circuit with the anode ends of said resistors at diagonally opposite terminals thereon, a diode rectifier connected between said bridge terminals and poled to conduct in the direction of the squelch-control-stage anode terminal and provide signal cut off through the amplifier stage, signal-responsive bias-control means connected with the squelch control stage for varying the anode current flow thereto to provide a voltage balance at said bridge circuit terminals and cut off of conduction through said rectifier, thereby to permit signal translation through said amplifier stage, and means for adjusting said variable anode resistor to adjust the operating point of said system with respect to the signal level.

4. In a modulated signal receiver, a signal squelch system comprising in combination, an electronic-tube audio-frequency amplifier stage connected in circuit for signal translation and having an output circuit including a current-limiting anode resistor, an electronic-tube squelch control stage having an anode current supply circuit including a variable anode resistor, said resistors and the space paths of said amplifier and squelch control stages being connected to provide a bridge circuit with the anode ends of said resistors at diagonally opposite terminals thereon, a diode rectifier connected between said bridge terminals and poled to conduct in the direction of the squelch-control-stage anode terminal, said variable anode resistor providing adjustment of the potential at said last-named terminal to a value more negative than the other bridge terminal, signal-responsive bias-control means connected with the squelch control stage for varying the anode current flow through the anode resistor thereof in a direction and magnitude to balance the potentials at said bridge circuit terminals in the presence of received signal above a predetermined magnitude, thereby to cut off conduction of said rectifier and permit signal translation through said amplifier stage, and a signal bypass capacitor connected between the squelch control stage anode terminal and ground for the system to cut off signal translation through the amplifier stage in response to conduction by said diode rectifier in the absence of received signals above said predetermined magnitude.

5. In a modulated signal receiver, a signal squelch system comprising in combination, an amplifier tube connected for audio-frequency signal translation and an amplifier tube connected for signal translation control, said tubes being of like types and each having a cathode connected to system ground for the receiver, a control grid, and an anode connected for anode current supply through an anode resistor, a diode rectifier connected between said anodes and poled to conduct in the direction of the control amplifier tube anode, a signal by-pass capacitor connected between system ground and the control amplifier tube anode providing with said diode rectifier during conduction a series signal conducting path effective to cut off signal output at the anode of the signal translating tube, signal-responsive bias-control means for the control amplifier tube connected with the control grid thereof in polarity to reduce the anode current flow through the anode resistor of said tube in response to received signals above a predetermined amplitude and effect a reverse bias in said diode rectifier, thereby to cut off conduction by said diode rectifier and permit signal output from the anode of said signal amplifier tube to the signal output circuit, and means for varying the anode resistor of one of said amplifier tubes to vary the signal amplitude level for signal translating operation of said system.

6. In a modulated signal receiver, a signal squelch system comprising in combination, an audio frequency amplifier having a first amplifier tube for signal translation and a second amplifier tube for signal control, said tubes being of like pentode types and each having a cathode connected to system ground for the receiver, an anode and a control grid, a separate anode-current supply resistor connected with each of said anodes, an audio-frequency signal input circuit connected between the control grid and cathode of said signal amplifier tube, an audio-frequency signal output circuit connected between the anode and the cathode of said signal amplifier tube, a diode rectifier connected between said anodes and poled to conduct in the direction of the control amplifier anode, a signal by-pass capacitor connected between system ground and the control amplifier anode providing with said diode rectifier when conducting a series signal-conducting path to system ground effective to cut off signal output at the anode of the signal translating tube, signal-responsive bias-control means for the control amplifier tube connected with the control grid thereof to apply a biasing potential of a polarity and magnitude to reduce the anode current flow through the anode resistor of said tube in response to received signals above a predetermined amplitude and effect a reverse bias on said diode rectifier, thereby to cut off conduction by said diode rectifier and permit signal output from the anode of said signal amplifier tube to the signal output circuit, and means for varying the anode resistor of one of said control amplifier tubes to vary the signal amplitude level for signal translating operation of said system.

7. In a modulated signal receiver having a signal channel including an audio-frequency detector and an audio-frequency amplifier coupled thereto, a signal suppression system comprising in combination; a signal amplifier tube in said amplifier having a cathode connected to ground for the system, a control grid connected to receive demodulated signals, and an anode having a signal output-circuit connected thereto and including a current-limiting anode-current supply resistor; a signal suppression tube having a cathode connected to ground for the system, a control grid, and an anode; a signal bypass capacitor connected between system ground and said last-named anode;

a diode rectifier connected between said anodes and poled to conduct in a direction from the amplifier tube anode to the suppression tube anode and to provide upon conduction a low impedance connection between the amplifier tube anode and system ground through said bypass capacitor; an anode current supply resistor connected with the anode of the suppression tube to adjust the anode potential to a value negative with respect to the potential of the amplifier tube anode by an amount to effect conduction by the diode rectifier and signal cutoff at the amplifier tube anode and output circuit; signal rectifier means connected with the signal channel at a point preceding the detector for applying a signal responsive bias potential to said suppression tube grid in the presence of received signals above a predetermined amplitude effective to increase the anode potential of the suppression tube in a positive direction and reverse bias the diode rectifier, thereby to cutoff conduction and provide signal translation from the anode of the signal amplifier tube through the output circuit.

No references cited.